Nov. 24, 1953 V. V. VEENSCHOTEN 2,660,072
DUAL CONTROL MECHANISM FOR VALVES AND THE LIKE
Filed Sept. 19, 1950 4 Sheets-Sheet 2

INVENTOR.
VINCENT V. VEENSCHOTEN
BY
W. H. Sullivan
ATTORNEY

Nov. 24, 1953 V. V. VEENSCHOTEN 2,660,072
DUAL CONTROL MECHANISM FOR VALVES AND THE LIKE
Filed Sept. 19, 1950 4 Sheets-Sheet 3

INVENTOR.
VINCENT V. VEENSCHOTEN
BY
W. G. Sullivan
ATTORNEY

Patented Nov. 24, 1953

2,660,072

UNITED STATES PATENT OFFICE 2,660,072

DUAL CONTROL MECHANISM FOR VALVES AND THE LIKE

Vincent V. Veenschoten, Erie, Pa., assignor to Continental Foundry and Machine Company, East Chicago, Ind., a corporation of Delaware Application September 19, 1950, Serial No. 185,588

8 Claims. (Cl. 74—625)

This invention relates to dual control mechanism for valves and the like, and more particularly to mechanism of the above type whereby a valve or the like may be selectively operated by manual or power means.

I am aware that it has previously been proposed to control a valve or the like device by mechanism which can be either manually or power actuated. However, prior mechanism of this general type with which I am familiar, when shifting from one type of control to the other, require disengagement of gears, disconnecting of links, actuation of clutches and the like, to avoid having the control taking over the device back-drive or otherwise influence the other control. I have devised a mechanism whereby a valve or the like device may be selectively controlled by manual or power means and wherein no intermediate shifting means or operation is required to avoid back-driving or the like between the control means.

According to the invention, I provide a shaft adapted to actuate a valve or the like which is threaded within a rotatable but axially immovable sleeve. The sleeve is rotatable by power means whereby the shaft will be moved axially. The shaft is also adapted to be manually rotated by means which permit the shaft to move axially relative thereto. When the power means is controlling the device the shaft merely moves axially relative to the manual control means and when the manual means is controlling the device the power means merely holds the sleeve stationary whereby the shaft will be moved axially.

It is a primary object of the invention to provide a mechanism adapted to selectively control valves or the like by manual or power means, and wherein control can be transferred from one to the other means without shifting gears, actuating links or clutches and the like.

Another object of the invention is to provide a mechanism of the above type which is relatively simple and economical of construction.

Another object of the invention is to provide a mechanism of the above type which can be easily adapted to any shaft which is axially movable to control a device.

Other objects of the invention and the invention itself will become increasingly apparent from a consideration of the following description and drawings wherein.

Figure 1:
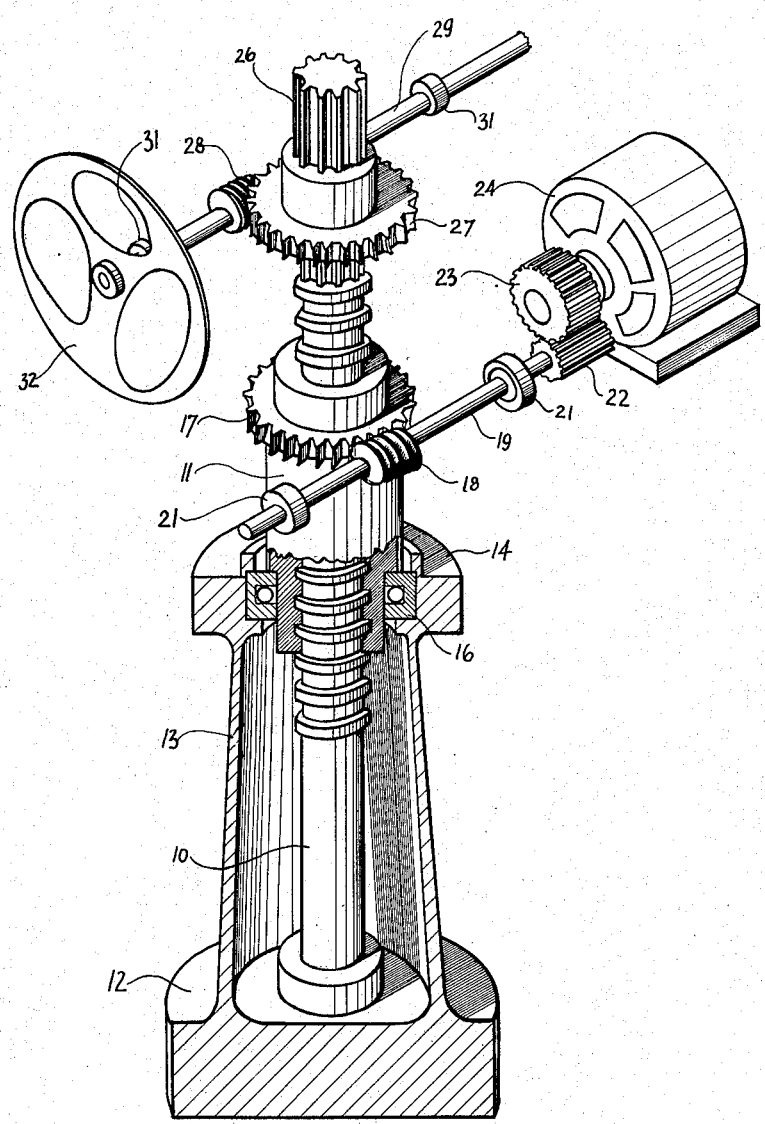
Figure 1 is a diagrammatic perspective view of mechanism embodying the invention, with parts broken away for clearness of illustration.

Referring now to the drawings, and particularly Figure 1, I have indicated at 10 an axially movable shaft which threadedly engages a sleeve 11. Shaft 10 may control any desired device by reverse axial movement but for purpose of illustration it is shown as controlling the feed water valve for a boiler.

The valve housing, indicated at 12, has a column or yoke 13 extending upwardly therefrom which terminates in a flange 14 forming a mounting for a bearing 16. Bearing 16 rotatably supports sleeve 11 but prevents the sleeve from moving axially as will be explained in detail later. Sleeve 11 has a worm gear 17 integral therewith which engages a worm 18 fixed to a shaft 19 journaled in bearings 21—21. Shaft 19 is driven by a pinion 22 engaging a gear 23 fixed to the shaft of a reversible motor 24.

It will be apparent that since sleeve 11 is axially fixed that rotation of the sleeve in either direction will cause shaft 10 to move axially and thereby change the position of a valve or other device which shaft 10 actuates or controls. The upper portion of shaft 10 is splined as indicated at 26 to slidingly interlock with a gear 27 which engages a worm 28 fixed to a shaft 29 journaled in bearings 31 and rotatable by a hand wheel 32.

Rotation of sleeve 11 by the power means or motor 24 will cause shaft 10 to move axially since there is sufficient resistance in the gearing connections between hand wheel 32 and shaft 19 to prevent rotation of the shaft although the shaft is permitted to move axially relative to gear 27 due to the splined connection therebetween.

In the event the power means or motor 24 fails, the device actuated by shaft 10, can be quickly operated by manual means through hand wheel 32 and in this instance the resistance offered by the reduction gearing between the motor and the sleeve 11 is sufficient to prevent the sleeve from rotating and resultantly the shaft 10 is directly controlled by hand wheel 32 without back-driving motor 24. In other words, when motor 24 fails for any reason hand wheel 32 can immediately take over control of shaft 10 without any intermediate operation being required such as shifting gears, disconnecting links, actuating clutches and the like. In the event shaft 10 operates a feed water valve for a boiler it will be apparent that in an emergency it is highly imperative that the feed water valve be controlled in a minimum time. The mechanism disclosed permits the device to be immediately controlled manually without an intermediate manual operation normally required (disengaging clutches and the like) to avoid the resistance encountered in attempting to back-drive the power means. In the event the power means should be placed in operation while an operator grasps the hand wheel there is no danger of injuring the operator since no intermediate manual operation is required to avoid back-driving the hand wheel.

Figure 2:
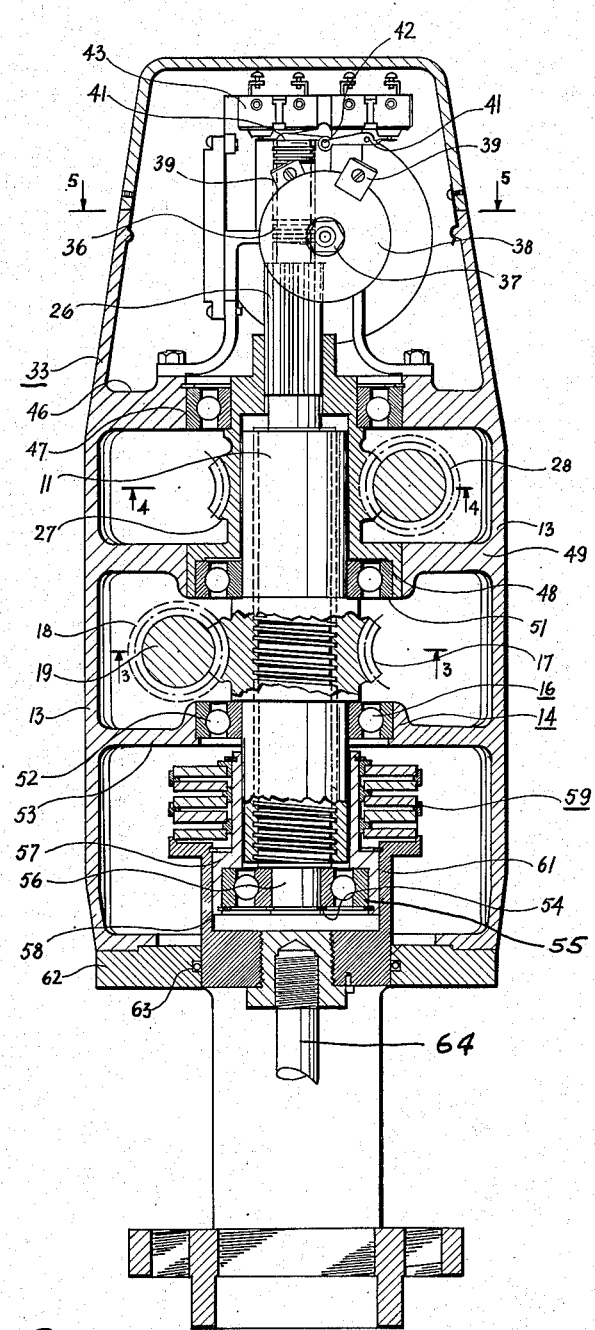
Figure 2 is a vertical sectional view of practical mechanism illustrated diagrammatically in Figure 1.

Referring now to Figure 2, a portion of the mechanism diagrammatically disclosed in Figure 1 is enclosed by a gear housing generally indicated at 33. It will be noted that the portion of shaft 10 above the splines 26 is formed to provide a plurality of closely spaced annular teeth 36 which engage a gear 37 whereby axial movement of shaft 10 will rotate a cam disc 38 operably connected to gear 37. Each tooth is bisected by a horizontal plane extending at right angles to the axis of shaft 10 so that a rack and gear connection is maintained between the teeth 36 and gear 37 regardless of the relatively rotated position of shaft 10. Disc 38 has one or more cam elements 39 secured thereto adapted to actuate movable contact arms 41 of limit switches. In other words, when the cam disc 38 rotates clockwise (Figure 2) due to elevation of shaft 10, the left hand element 39 will engage a roller portion 42 of the left hand contact arm 41 and rock the left hand contact arm out of engagement with the left hand limit switch 43. This breaks the motor circuit and assuming a valve is left in its maximum open position, the valve will remain in this position until the boiler feed water demand decreases whereupon the circuit for operating the motor 24 in a reverse direction will be closed, in a well known manner, and the motor will continue to effect lowering of the shaft 10 until the circuit is broken either by other means or until the right hand limit switch is actuated to break the motor circuit.

Ordinarily, the motor 24 will control axial movement of shaft 10 but in the event of an emergency, such as power or motor failure, it is highly imperative that the boiler feed water supply or the like be immediately taken over by manual means in a minimum time. Prior valve or the like control mechanism of this general type with which I am familiar require that some intermediate manual operation be performed before the manual control can be effective, such as a shifting means or the like to avoid attempting to back drive the power means. Under emergency conditions, particularly for a boiler feed water control, it is imperative that control be quickly shifted, and I have devised an arrangement whereby control can be shifted from power to manual means or vice versa without a time delaying intermediate operation. The fact that an operator can immediately take over control through manipulation of hand wheel 32 is of considerable importance since normal control is by motor or power means and emergencies are infrequent. Accordingly, an operator under emergency conditions may forget how to declutch the power means and connect the manual means in a conventional drive unit.

Now, assume that the shaft 10 and the valve or the like actuated thereby is under manual control. Since the motor 24 is not operating the gearing connections between the motor and sleeve 11 will prevent rotary movement of the sleeve. Therefore, rotation of hand wheel 32 will rotate shaft 10 and resultantly effect axial movement of the shaft relative to the sleeve.

Housing 33 is formed with a top internal flange 46 which engages the outer race of a ball bearing 47, the inner race of the bearing seating on a shoulder formed on gear 27. The lower portion of gear 27 is of inverted cup form as indicated at 48 with the outer wall of this portion having a sliding fit with a second internal flange 49 of the housing 33 and being journaled on the outer race of a bearing 51. The inner race of bearing 51 seats on a shoulder formed on sleeve 11 and a second shoulder on the sleeve forms a seat for the inner race of a bearing 52. The outer race of bearing 52 is seated in a lower internal flange 53 formed in housing 33. It will now be apparent that gear 27 and sleeve 11 are fixed against axial movement and that any axial thrust is transmitted to the housing 33 through the bearings 47 and 52. Also, it will be noted that the upper tubular portion of gear 27 is internally splined to engage with the splines 26 of shaft 10.

A lock ring 54 secures the inner race of a bearing 55 to shaft 10, the inner race being telescoped over a reduced diameter portion 56 of shaft 10 and clamped between a shoulder on the shaft and the lock ring. The outer race of bearing 55 is clamped between a shoulder formed on a sleeve element 57 and a lock ring 58 engaging the outer race and the sleeve. Thus, any axial movement of shaft 10 will be transmitted to sleeve 57. A plurality of flat disc springs, and inner and outer spacer rings, generally indicated at 59 transmit axial movement of sleeve 57 to a valve stem element 61. Element 61 makes a sliding fit with a circular flange 62 integral with or supported by yoke arms extending from a valve or the like housing. Since housing 33 contains a suitable lubricant, a grease seal in the form of an O ring 63 seated in a groove formed in flange 62 is provided. A valve stem or spindle 64 is adjustably secured to valve element 61. The function of bearing 55 is to prevent the spindle 64 from turning when the control mechanism is manually operated.

Although the springs and spacer rings indicated at 59 transmit the driving force from the shaft 10 to a valve stem element or the like, and in normal operation the springs are under considerable initial compression and move up or down as a unit with the element 61, they serve an additional purpose. They are used to absorb any movement produced by the expansion of a valve stem when the unit is used as a valve drive. For example, assume the valve is in a line handling a hot fluid such as steam and further assume that when the line is not in use the valve has been closed by the motor. When hot fluid is subsequently admitted to the line it would cause that portion of the valve stem within the valve body to expand and seat the valve much tighter than it had been seated by the motor and probably to a degree that the motor could not open the valve. To avoid such a situation, the spring relief device 59 is provided which for illustration comprises five flat disc springs separated by two inner and two outer spacer rings to allow room for deflection which occurs between the inner and outer edges of the discs. The load is applied when the stem expands, through element 61, to the outer edge of the lower disc spring, then through the springs to the inner edge of the top spring, then through the snap ring to sleeve 57, and through bearing 55 to shaft 10.

Figure 4:
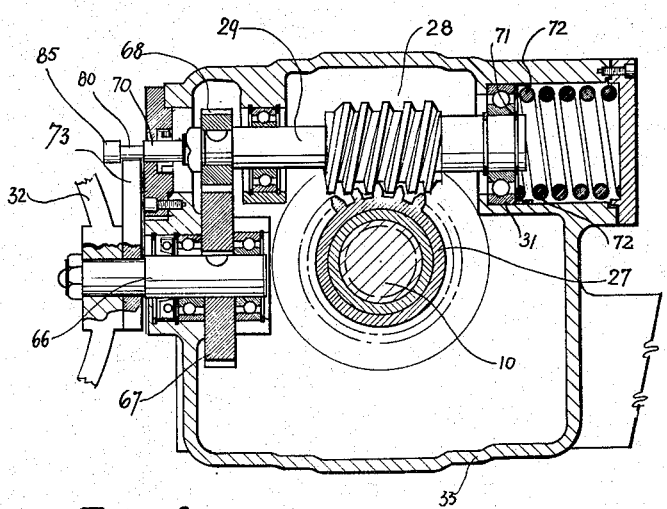
Figure 4 is a transverse section taken along the line 4—4 of Figure 2.
Figure 5:
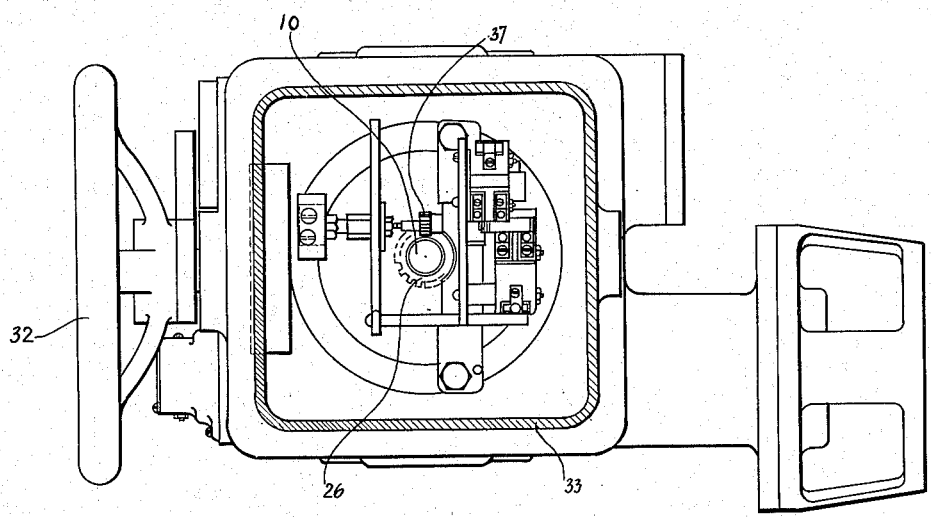
Figure 5 is a top plan view of the mechanism illustrated in Figure 2 with the housing cut away along a plane indicated at 5—5.

Referring now to Figure 4, the hand wheel 32 is fixed to a short shaft 66 which has a spur gear 67 keyed thereto, and this gear engages a pinion 68 keyed to shaft 29 having the worm 28 formed thereon. The worm engages gear 27 splined to shaft 10. Due to the considerable leverage possible between the hand wheel 32 and the gearing connections with shaft 10, I provide means whereby the amount of torque capable of being exerted through the hand wheel with the valve in a closed position is limited. A cup form member 71 affixed to shaft 29 abuts an end convolution of a compression spring 72 which limits the amount of closing force that can be applied by the hand wheel 32. The initial compression of the spring determines the thrust at which worm 28 begins to move laterally and the spring normally tends to force worm 28 away from the hand wheel. When gear 27 encounters so much resistance that it cannot be driven further, the worm 28 will move towards the hand wheel compressing spring 72 and as shaft 29 moves to the left a reduced end portion 70 thereof will project out through the side of housing 33 and get in the path of a short lever 73 keyed to the hand wheel shaft externally of the housing and thereby prevents further rotation of the hand wheel.

Figure 3:
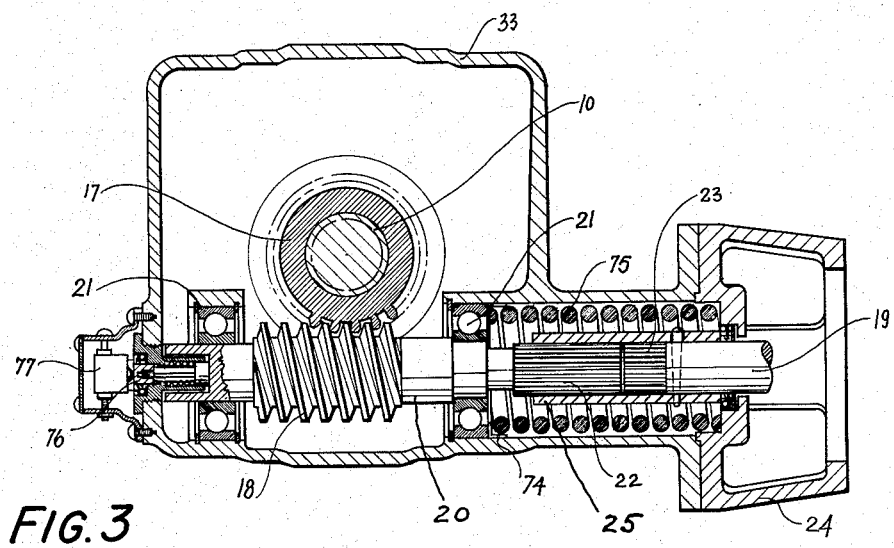
Figure 3 is a transverse section taken along the line 3—3 of Figure 2.

Referring now to Figure 3, it will be noted that the shaft 19 illustrated diagrammatically as a unitary shaft in Figure 1 may comprise two parts for a practical mechanism. The right hand part of shaft 19 may be the shaft of motor 24. The gear 23 may comprise external splines formed on the outer end of the motor shaft to rotatably inter-lock with internal splines in a coupling 25. A pin inter-locks shaft 19 and coupling 25. The left hand shaft part, as shaft indicated at 20, is provided with external splines corresponding to pinion 22 of Figure 1 which engage the internal splines of coupling 25 to rotatably inter-lock shaft 20 and coupling 25 but which will permit relative axial movement therebetween. Shaft 20 is journaled in bearings 21 and has a cup shaped member 74 affixed thereto which engages one end of a compression spring 75. This spring is initially compressed and forces the right hand bearing 21 and the shaft 20 assembly away from motor 24. In this normal position, illustrated in Figure 3, a plunger 76 mounted in the end of shaft 20 holds a thrust limit switch 77 closed. The motor control current passes through this closed switch. When the valve or other device becomes closed or loaded the force required to turn gear 17 increases and worm 18 tends to move towards motor 24 when it can no longer overcome the resistance of the load. As worm 18 moves towards the motor, plunger 76 moves away from limit switch 77 thereby disconnecting power from the motor. As the motor coasts to a stop, its energy is dissipated by further compressing spring 75.

Although for convenience of description in Figure 3, I have compared the splines 23 of shaft 19 with the motor gear 23 shown in Figure 1 and the splines 22 of shaft 20 with pinion 22 it is understood that suitable reduction gearing will be interposed between the motor 24 and shaft 19.

The initial compression of the springs 72 and 75 determines or limits torque which can be applied on the down stroke either by the motor or manually. It will be noted that torque limiting means have not been provided for the upstroke since in driving or operating a valve the principal concern is with tight seating and it is necessary that a certain amount of seating force be applied before cutting off the power. The upper limit is not so important and a simple position type limit switch such as 43 will suffice, where it is important that the valve does not completely close the other position limit switch (the right hand switch 43 illustrated in Figure 3) can be adjusted to determine the lowermost position of the valve stem although as previously explained the lower limit is normally controlled by the thrust switch 77.

The operation of the dual control mechanism described will now be explained in connection with controlling the feed water supply for a boiler. The shaft 10 will be connected to the stem or spindle 64 of a feed water valve in the manner previously described. It will be noted that the diagrammatic view (Figure 1) shows right hand threads on shaft 10 and right hand threads on the worm 28 whereby as the hand wheel 32 is rotated clockwise, in the event of an emergency the feed water valve will be closed. Since it is conventional to rotate a hand wheel clockwise to close a valve or the like, it is important that the valve be moved in a closing direction by manual operation of the hand wheel in a clockwise direction under emergency conditions. For convenience of illustration, the threads of shaft 10 (Figure 1) and the threads of worm 28 are illustrated as right hand threads whereby manual rotation of hand wheel 32 in a clockwise direction will close the feed water valve. However, in a practical mechanism, such as illustrated in Figures 2 to 5 inclusive, it has been found advisable to provide shaft 10 with left hand threads and to effect lowering movement of valve stem 64 by clockwise rotation of hand wheel 32 the worm 28 fixed to shaft 29 has also been provided with left hand threads. In any event, shaft 10 will be connected to the stem or spindle 64 of a feed water valve or the like, in the manner previously described, whereby elevating of shaft 10 will cause the valve to move in an opening direction increasing the rate of supply of feed water. Lowering movement of shaft 10 will cause the valve to move in a closing direction decreasing the rate of supply of feed water.

Normally, valve movement will be under the control of power means such as the reversible motor 24. To open the valve, shaft 19 as viewed from the left hand end of Figure 3 will rotate clockwise. Gear 17, driving the equivalent of a yoke nut on a hand valve will turn clockwise as viewed in Figure 3. Shaft 10 also tends to turn clockwise but is restrained by splines 26 interlocked with gear 27 and this gear is restrained from clockwise rotation by worm 28. The thrust transmitted by worm 28 is absorbed by the right hand bearing 31 (Figure 4). To close valve, the motor 24 is reversed and gear 17 will turn counter-clockwise as reviewed in Figure 3. As previously mentioned various means for automatically reversing an electric motor in response to a change in demand for feed water are well known and any suitable means may be used. The thrust transmitted by worm 28 during closing movement of the valve is absorbed by spring 72 (Figure 4). When the valve is seated under a thrust determined by the strength of spring 75, the thrust limit switch 77 is opened as previously described cutting off power from motor 24.

In the event of an emergency requiring closing of the valve an operator merely rotates hand wheel 32 clockwise and when the valve is seated under a thrust determined by the strength of spring 72, further rotation of the hand wheel is limited due to end portion 70 of shaft 29 being disposed in the path of lever 73 as previously described. In the event of an emergency requiring opening of the valve an operator merely rotates the hand wheel 32 counter-clockwise and the valve may be fully opened if desired.

It will now be understood that I have provided a relatively simple arrangement whereby a device such as a feed water valve can be selectively controlled either by power or manual means without requiring any intermediate operation when shifting from one type of control to the other.

I wish it to be understood that I do not desire to be limited to the exact details of construction shown and described, since obvious modification will occur to persons skilled in the art.

What I claim is as follows:

1. A dual control mechanism for valves and the like comprising an axially movable threaded shaft adapted to be secured to the device to be controlled, an axially fixed rotatable sleeve threadedly engaging the shaft, a first gear fixed to the sleeve, a first worm engaging the first gear and axially movable, a reversible electric motor for driving the worm, a second gear splined to the shaft, a second worm engaging the second gear, manual means for driving the second worm, pre-loaded spring means forcing the first worm in one axial direction, a thrust limit switch controlling the motor circuit and adapted to be closed when the worm is forced in said one axial direction, the switch being adapted to open when the worm moves in the opposite axial direction due to the resistance of the sleeve to turning being greater than the spring means force, and the amount of pre-loading of the spring means determining the thrust on the shaft at the time the sleeve ceases to turn.

2. The dual control mechanism as described in claim 1 and wherein a position limit switch is connected to the motor circuit, and means adapted to open the switch are operably connected to the shaft whereby when the shaft reaches a pre-determined axial position the switch will be opened.

3. The dual control mechanism as described in claim 1 and wherein the second worm is mounted on an axially movable shaft, pre-loaded spring means force the second worm in one axial direction, a hand wheel is fixed to the shaft, and means are provided whereby movement of the shaft in the opposite axial direction due to the spring means force being overcome by resistance to rotation of the second gear will block further rotation of the hand wheel.

4. The dual control mechanism as described in claim 1 and wherein a valve stem element is connected to the shaft by a plurality of flat disc springs and spacer rings whereby the element will normally move axially as a unit with the shaft but axial expansion of the element can be accommodated when the shaft is axially fixed.

5. A dual control mechanism for valves or the like comprising an axially movable threaded shaft adapted to be secured to the device to be controlled, an axially fixed rotatable sleeve threadedly engaging the shaft, a reversible electric motor for rotating the sleeve to control axial movement of the shaft, reversible manual means for rotating the shaft to control axial movement thereof, driving connections between the motor and sleeve adapted to hold the sleeve stationary when the motor is inoperative, driving connections between the manual means and shaft adapted to prevent the shaft from rotating but permitting axial movement thereof when the manual means is inoperative whereby either the manual means or motor may directly effect axial movement of the shaft without any intermediate operation, the shaft having a portion grooved to provide spaced annular teeth, a gear engaging said teeth in any relatively rotated position of the shaft whereby axial movement of the shaft will rotate said gear, and means operable by the gear for breaking the circuit to the motor.

6. A dual control mechanism for valves or the like comprising an axially movable threaded shaft adapted to be secured to the device to be controlled, an axially fixed rotatable sleeve threadedly engaging the shaft, reversible power means for rotating the sleeve to control axial movement of the shaft, reversible manual means for rotating the shaft to control axial movement thereof, driving connections between the power means and sleeve adapted to hold the sleeve stationary when the power means is inoperative, driving connections between the manual means and shaft adapted to prevent the shaft from rotating but permitting axial movement thereof when the manual means is inoperative whereby either control means may effect axial movement of the shaft when the other means is inoperative without requiring any intermediate operation, said driving connections between the manual means and the shaft comprising a gear splined to the shaft, a worm operable by the manual means and axially movable, pre-loaded spring means acting to force the worm in one axial direction, and means effective when the worm moves in the opposite axial direction due to the resistance of the gear to rotation being greater than the spring means force to prevent continued operation of the manual means.

7. A dual control mechanism for valves or the like comprising an axially movable threaded shaft adapted to be secured to the device to be controlled, an axially fixed rotatable sleeve threadedly engaging the shaft, reversible power means for rotating the sleeve to control axial movement of the shaft, reversible manual means for rotating the shaft to control axial movement thereof, driving connections between the power means and sleeve adapted to hold the sleeve stationary when the power means is inoperative, driving connections between the manual means and shaft adapted to prevent the shaft from rotating but permitting axial movement thereof when the manual means is inoperative whereby either control means may effect axial movement of the shaft when the other means is inoperative without requiring any intermediate operation, said driving connections between the power means and sleeve comprising a gear fixed to the sleeve, a worm operable by the power means and axially movable, pre-loaded spring means acting to force the worm in one axial direction, means effective to operate the power means when the worm is forced in said one axial direction, and movement of the worm in the opposite axial direction due to the resistance of the sleeve to rotation being greater than the spring means force rendering said effective means inoperable.

8. A dual control mechanism for valves or the like comprising an axially movable threaded shaft adapted to be secured to the device to be controlled, an axially fixed rotatable sleeve threadedly engaging the shaft, reversible power means for rotating the sleeve to control axial movement of the shaft, reversible manual means for rotating the shaft to control axial movement thereof, driving connections between the power means and sleeve adapted to hold the sleeve stationary when the power means is inoperative, driving connections between the manual means and shaft adapted to prevent the shaft from rotating but permitting axial movement thereof when the manual means is inoperative whereby either control means may effect axial movement of the shaft when the other means is inoperative without requiring any intermediate operation, the shaft having a portion formed with spaced annular teeth, a gear engaging said teeth in any relatively rotated position of the shaft whereby axial movement of the shaft will effect rotation of the gear, means for rendering the power means inoperative, and the gear being operably connected to said last mentioned means.

VINCENT V. VEENSCHOTEN.

References Cited in the file of this patent

UNITED STATES PATENTS

| Number | Name | Date |
|---|---|---|
| 1,966,209 | Miller | July 10, 1934 |
| 2,005,891 | Elberty, Jr. | June 25, 1935 |
| 2,318,010 | Panish | May 4, 1943 |
| 2,324,211 | Hodgson | July 13, 1943 |
| 2,390,882 | Hopkins | Dec. 11, 1945 |
| 2,391,418 | Hodgson | Dec. 25, 1945 |
| 2,414,032 | Fawkes | Jan. 7, 1947 |
| 2,420,552 | Morrill | May 13, 1947 |